United States Patent
Ormseth et al.

(10) Patent No.: US 10,318,597 B2
(45) Date of Patent: Jun. 11, 2019

(54) SYSTEMS AND METHODS FOR RECOMMENDING FOLLOW UP CONTENT

(71) Applicant: Facebook, Inc., Menlo Park, CA (US)

(72) Inventors: Holly Marie Ormseth, San Francisco, CA (US); Elad Gerson, New York, NY (US); Guy Dassa, Mamaroneck, NY (US); Khalid Bakry El-Arini, Fremont, CA (US); Gaurav Shankar, Secaucus, NJ (US); Yuanxuan Wang, San Carlos, CA (US); Varun Kacholia, Sunnyvale, CA (US); Prasoon Mishra, Mountain View, CA (US); David Vickrey, Mountain View, CA (US); Sanjeet Uday Hajarnis, Sunnyvale, CA (US); Sahil P. Thaker, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 547 days.

(21) Appl. No.: 14/579,710

(22) Filed: Dec. 22, 2014

(65) Prior Publication Data

US 2016/0179968 A1 Jun. 23, 2016

(51) Int. Cl.
  *G06F 17/30* (2006.01)
  *G06Q 30/02* (2012.01)
  *G06F 3/0482* (2013.01)
  *G06F 16/9535* (2019.01)
  *G06Q 50/00* (2012.01)

(52) U.S. Cl.
  CPC ........ *G06F 16/9535* (2019.01); *G06F 3/0482* (2013.01); *G06Q 30/0251* (2013.01); *G06Q 50/01* (2013.01)

(58) Field of Classification Search
  CPC ................ G06Q 50/01; G06Q 30/0251; G06F 17/30017; G06F 16/9535; G06F 3/0482; G06C 30/0251
  See application file for complete search history.

(56) References Cited

U.S. PATENT DOCUMENTS

| | | | | |
|---|---|---|---|---|
| 8,214,431 B2* | 7/2012 | Miyajima | .............. | G01D 5/345 709/201 |
| 2008/0244740 A1* | 10/2008 | Hicks | ...................... | G06F 17/24 726/22 |
| 2012/0209850 A1* | 8/2012 | Kikin-Gil | ......... | G06F 17/30696 707/738 |
| 2012/0254188 A1* | 10/2012 | Koperski | .......... | G06F 17/30663 707/740 |
| 2013/0151611 A1* | 6/2013 | Graham | ................ | G06Q 50/01 709/204 |
| 2015/0006286 A1* | 1/2015 | Liu | ........................ | G06Q 50/01 705/14.53 |

OTHER PUBLICATIONS

U.S. Appl. No. 14/307,331, filed Jun. 17, 2014.

* cited by examiner

*Primary Examiner* — Ting Z Lee
(74) *Attorney, Agent, or Firm* — Sheppard Mullin Richter & Hampton LLP

(57) ABSTRACT

Systems, methods, and non-transitory computer readable media configured to detect access by a user to an original content item relating to a story. At least one of a comments based technique, a token based technique, and a tag based technique is performed on content items. Constraints are applied to identify at least one follow up content item from the content items relating to a development of the story.

17 Claims, 7 Drawing Sheets

SYSTEMS AND METHODS FOR RECOMMENDING FOLLOW UP CONTENT

FIELD OF THE INVENTION

The present technology relates to the field of content provision. More particularly, the present technology relates to techniques for recommending pages.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, a user may navigate to or be presented with various content items in a social network. The content items can come from pages associated with members of the social network. In some instances, the content items may be of high interest to the user. If the user expresses interest in a particular content item, the social network may attempt, based on the content item, to provide to the user additional, related content items that likewise would be of high interest to the user. Provision of additional content items that are of high interest to the user enhances user experience and can help realize the full potential of the social network. Unfortunately, attempts to provide such additional content items and to maintain a high level of interest from the user often fail.

The growing size of social networks also poses problems with respect to the goal of providing content items of high interest to the user. As available content grows in amount, the likelihood of finding more content items of high interest to the user should increase in theory. However, in practice, the ability to identify content items of high interest to the user can be complicated by the sheer volume of content.

SUMMARY

Various embodiments of the present disclosure can include systems, methods, and non-transitory computer readable media configured to detect access by a user to an original content item relating to a story. At least one of a comments based technique, a token based technique, and a tag based technique is performed on content items. Constraints are applied to identify at least one follow up content item from the content items relating to a development of the story.

In an embodiment, the applying constraints to identify at least one follow up content item further comprises applying a time difference threshold between a time of the original content item and a time of the at least one follow up content item and applying a weight value threshold to the at least one follow up content item.

In an embodiment, the performing a comments based technique on content items further comprises identifying a first posting having a first link and associated with a first time, identifying a second posting, in response to the first posting, having a second link and associated with a second time, and determining that the second link relates to the at least one follow up content item and that the first link relates to the original content item when the second time is subsequent to the first time.

In an embodiment, the performing a token based technique on content items further comprises tokenizing at least a portion of the original content item and at least a portion of the content items, generating representations of the original content item and the content items based on the tokenizing, comparing similarity between the original content item and the content items based on the representations, and determining that a content item of the content items is the at least one follow up content item based on the similarity between the original content item and the content item.

In an embodiment, the generating representations further comprises performing a tf-idf technique.

In an embodiment, the comparing similarity between the original content item and the content items further comprises performing cosine similarity.

In an embodiment, the performing a tag based technique on content items further comprises receiving a tag associated with the story relating to the original content item, the tag based on a category and a hierarchical level of a hierarchical index, and determining that a content item of the content items is the at least one follow up content item when the content item is labeled with the tag.

In an embodiment, the constraints are modulated to selectively increase or decrease an amount of the at least one follow up content item based on modification of at least one of a time difference threshold and a weight value threshold.

In an embodiment, a machine learning model is trained to identify follow up content items in a supervised process based on user interaction with the at least one follow up content item or manual supervision of identification of the at least one follow up content item.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Follow Up Content Items

Figure 1:
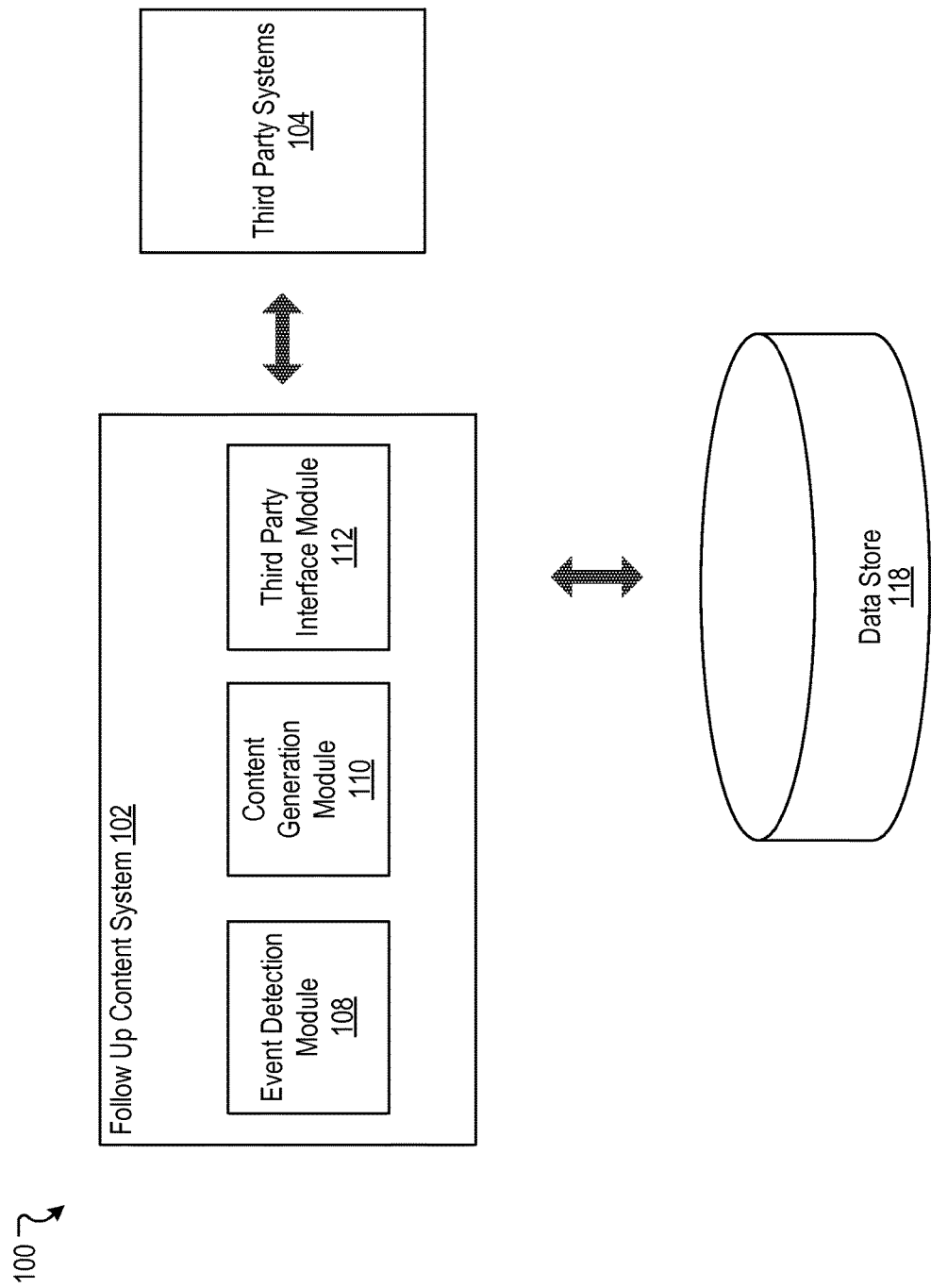
FIG. 1 illustrates a system including an example follow up content system and third party systems, according to an embodiment of the present disclosure.

People use computing devices (or systems) for a wide variety of purposes. Computing devices can provide different kinds of functionality. Users can utilize their computing devices to produce information, access information, and share information. In some cases, users can use their computing devices to generate and publish content items. Content items can include any combination of content types, such as text, images, videos, and audio. The content items can be shared for consumption by others through a social networking system. The content items can be shared in a variety of formats, such as posts to the social networking system.

The conventional presentation of content items can entail many disadvantages. When a user indicates approval of or interest in a first content item, the social networking system may attempt to identify additional content items that are of interest to the user. However, when presented to the user, the additional content items may not be desirable to the user because they are not well matched with the interests or profile of the user. In such circumstances, the user can be provided with content items that the user deems unfamiliar, irrelevant, or worse. As a result, the user experience of the social networking system can suffer.

The growing size of social networks also poses problems with respect to the goal of providing content items of high interest to the user. As membership with the social network grows, so does the content posted to the social network. The challenge can be particularly significant when the user has indicated approval of a content item on a particular topic and the social network is confronted with the task of presenting additional content items that are related to the same topic. While conventional techniques sometimes can provide content items of general interest to a user, they often struggle to timely locate and deliver targeted content items that focus on subject matter in which the user has already expressed interest.

An improved approach to the presentation of follow up content items overcomes the foregoing and other disadvantages associated with conventional approaches. In general, systems and methods of the present disclosure can identify follow up content items that are related to a story of an original content item that a user has accessed and can present the follow up content items to the user. In particular, interaction by the user with the original content item can be detected. The original content item may relate to a particular story. Follow up content items can relate to the story of the original content item and in particular to subsequent developments (e.g., sub-stories) relating to the same story. Follow up content items can be identified by a variety of techniques. The techniques may include one or any combination of, for example, a token based technique, a comments based technique, and a tag based technique. The techniques to identify follow up content items can be used individually or in any selected combination to identify follow up content items for presentation to the user. The techniques may be based on data that is managed by the social networking system and data that is provided by a third party that can interface with the social networking system. The follow up content items can be content items originally posted to the social networking system or posted to websites managed by the third party publishers of content.

FIG. 1 illustrates an example system 100 including an example follow up content system 102 configured to interact with third party systems 104 to determine follow up content items, according to an embodiment of the present disclosure. An original content item can relate to a story that the user has selected, indicated approval of, or otherwise accessed. The story can be one or more particular topics, events, subject matter, or the like. The follow up content items can specifically relate to one or more developments of the story. The follow up content items can be presented to the user in response to the user having accessed (e.g., liked) the original content item. The original content item and the follow up content items can be published by the social networking system or by one or more of the third party systems 104 with which the social networking system can be connected. The social networking system may serve as a platform through which the third party systems 104 may provide and receive data relating to use of websites managed by the third party systems 104. The determination of follow up content items can be based on data provided by the social networking system and one or more of the third party systems 104.

The follow up content system 102 can include an event detection module 108, a content generation module 110, and a third party interface module 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the follow up content system 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the follow up content system 102 can be implemented, in part or in whole, as software running on one or more computing devices or systems, such as on a user or client computing device. For example, the follow up content system 102 can be implemented as or within an application (e.g., app), a program, or an applet, etc., running on a user computing device or client computing system. In some instances, the follow up content system 102 can, in part or in whole, be implemented within or configured to operate in conjunction with a social networking system (or service), such as the social networking system 730 of FIG. 7. It should be understood that many variations are possible.

The event detection module 108 can detect access by a user of an original content item in response to which the follow up content system 102 can present follow up content items. The user can access the original content in an variety of manners detectable by the event detection module 108. For example, the user can access and interact with (e.g., click, like, comment on, share, etc.) a content item relating to a story published by the social networking system or one of the third party systems 104. The event detection module 108 can receive an indication relating to user access to a story from a front end user tracking system of the social networking system when the access occurred through user interaction with the social networking system. The event detection module 108 can receive an indication relating to user access of an original content item from the third party interface module 112 when the access occurred through user interaction with one of the third party systems 104.

The content generation module 110 can identify follow up content items in response to user access to an original content item relating to a story. The follow up content items can be identified in a manner such that the follow up content items are specifically related to the story as developments of the story. Content items that may potentially qualify as follow up content items can be identified though one or more techniques. The techniques include, for example, a comment based technique, a token based technique, and a tag based technique. The techniques can be based on data provided by the social networking system, one of the third party systems 104, or both. In some instances, the interaction data can be filtered to enhance the identification of content items. Constraints to select follow up content items from the identified content items can be applied to the identified content items. The selected follow up content items can be presented to the user so that the user can access additional, targeted content, such as developments, about the story in which the user has expressed interest. The identified follow up content items can be organized and maintained to later facilitate the recommendation of follow up content items for other occasions. The content generation module 110 also can optimize the selection of follow up content items based on modulation of the constraints to select follow up content items and based on machine learning techniques. The content generation module 110 is discussed in more detail herein.

The third party interface module 112 may function as a communication interface with the other modules of the follow up content system 102 (and the social networking system) and the third party systems 104. The third party interface module 112 may include and interact with one or more APIs to facilitate the provision of data from the follow up content system 102 to the third party systems 104 and facilitate the provision of data from the third party systems 104 to the follow up content system 102. For example, the third party interface module 112 can receive an indication relating to user access to an original content item from a website of one of the third party systems 104. As another example, the third party interface module 112 can receive from the third party systems 104 data on which one or more of the techniques for identifying follow up content items are based, such as tag data, publication time data, etc. As yet another example, the third party interface module 112 can provide identified follow up content items to the third party systems 104 for presentation on the websites of the third party systems 104.

The data store 118 can be configured to store and maintain various types of data, such as the data relating to follow up content items. The data can include data relating to organization, weighting, scoring, and categorization of follow up content items with associated original content items. For example, the data store 118 can cluster content items based on one or more stories to which they relate. Such clustering can facilitate the identification of multiple follow up content items in relation to an original content item. The maintenance of data relating to content items stored by their associated stories can reflect any suitable historical time period, including for example, one week, 30 days, 60 days, six months, a year, five years, etc. The data store 118 can also maintain data regarding the historical behavior of the user throughout the social networking system and, in particular, the interactions of the user with various content items of the social networking system.

The data store 118 can also maintain other information associated with the social networking system. The information associated with the social networking system can include data about users, social connections, social interactions, locations, geo-fenced areas, maps, places, events, groups, posts, communications, content, account settings, privacy settings, a social graph, and various other types of data. In some implementations, the data store 118 can store information associated with users, such as user identifiers, user information, user specified settings, content produced by users, and various other types of user data. As shown in the example system 100, the follow up content system 102 can be configured to communicate and/or operate with the data store 118. In some embodiments, the identification, selection, presentation, or management of follow up content items in relation to an original content item can be performed by one or more of the techniques described in U.S. patent application Ser. No. 14/307,331, filed on Jun. 17, 2014 and entitled "Determining Stories of Interest Based On Quality Of Unconnected Content", which is incorporated by reference in its entirety herein.

Figure 2:
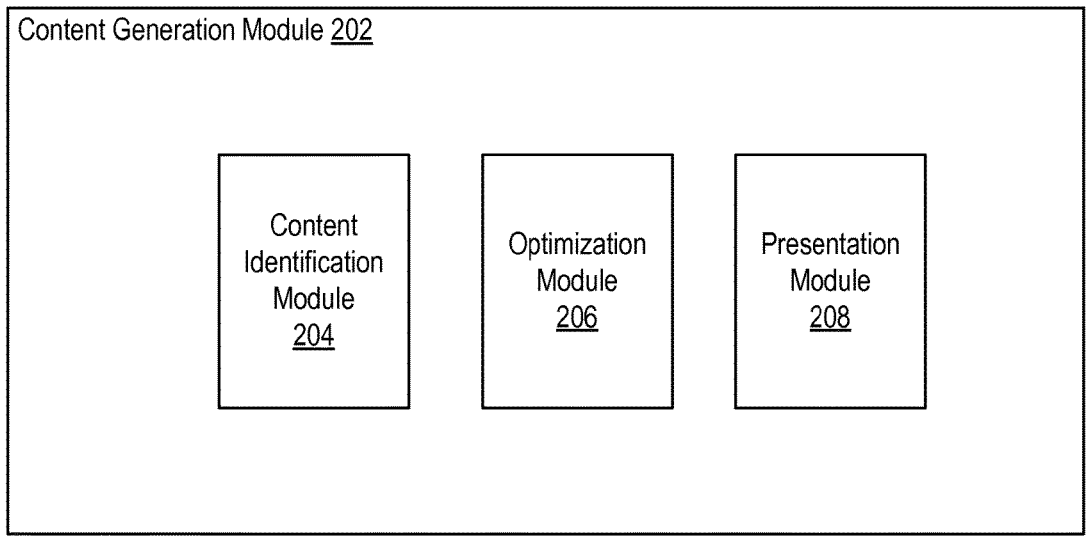
FIG. 2 illustrates an example content generation module, according to an embodiment of the present disclosure.

FIG. 2 illustrates an example content generation module 202 configured to generate follow up content items for presentation to a user, according to an embodiment of the present disclosure. In some embodiments, the content generation module 110 of FIG. 1 can be implemented with the content generation module 202. As shown in the example of FIG. 2, the content generation module 202 can include a content identification module 204, an optimization module 206, and a presentation module 208.

The content identification module 204 can identify follow up content items based on a story relating to an original content item accessed by the user. In some embodiments, the content identification module 204 of FIG. 2 can be implemented with the content identification module 302 of FIG. 3.

Figure 3:
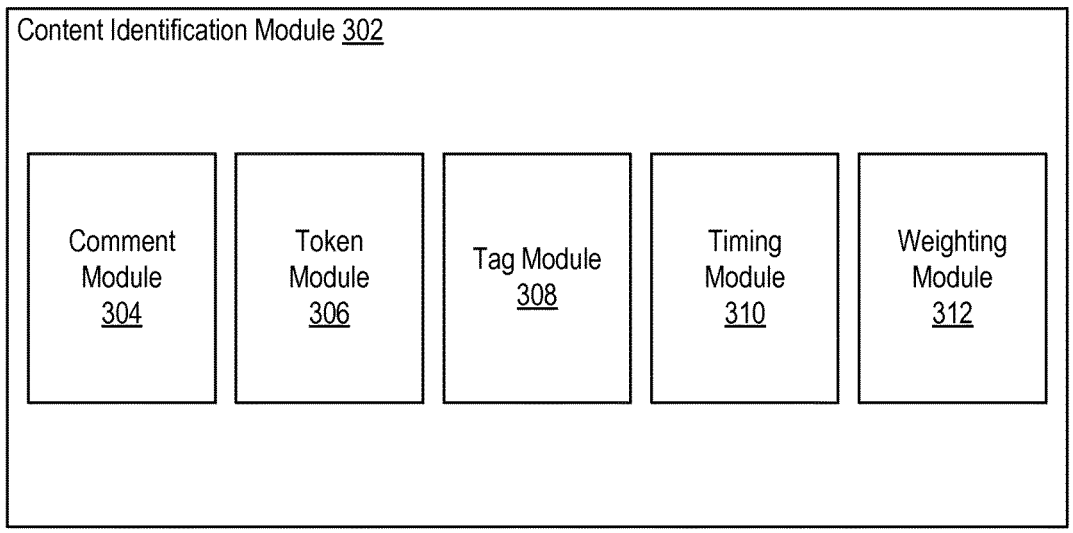
FIG. 3 illustrates an example content identification module, according to an embodiment of the present disclosure.

FIG. 3 illustrates an example content identification module 302 configured to identify follow up content items based on a story relating to an original content item accessed by a user, according to an embodiment of the present disclosure. As shown in the example of FIG. 3, the content identification module 302 can include a comment module 304 that implements a comment based technique to identify follow up content items, a token module 306 that implements a token based technique to identify follow up content items, a tag module 308 that implements a tag based technique to identify follow up content items, a timing module 310, and a weighting module 312. The identification of follow up content items can be based on one, some, or all of the comment module 304, the token module 306, and the tag module 308.

The comment module 304 can identify follow up content items based on a series of postings to the websites of the social networking system or the third party systems 104. The comment module 304 can detect a series of postings. The comment module 304 can determine with a certain confidence level that a first posting in a series is an original content item relating to a story and that one or more subsequent postings (e.g., second posting, third posting, fourth posting, etc.) in response to the first posting are follow up content items that also relate to and are developments of the same story. The determination can be empirically or heuristically based on an inference that a posting subsequent to an original posting often relates to the same story as the original posting. In some instances, the comment module 304 can determine with a certain confidence level that a first posting in a series is a follow up content item relating to a story and that a subsequent posting (e.g., second posting, third posting, fourth posting, etc.) is an original content item that also relates to the same story. The determination can be empirically or heuristically based on an inference that the first posting can be a follow up content item to a subsequent posting. As discussed in more detail herein, a follow up content item can be weighted to reflect the confidence level with which the follow up content item is identified in relation to an original content item.

For example, assume the comment module 304 has detected an original post (original posting) that includes a link L1. Assume further that the comment module 304 has detected subsequent comments (subsequent postings) posted in response to the original post. The subsequent comments include a first comment including a link L2 and a second comment including a link L3. In this example, the comment module 304 can determine with a relatively higher confidence level that the link L2 and the link L3 are follow up content items to link L1 because link L2 and link L3 are posted in response to and subsequent to link L1. In certain circumstances, the comment module 304 can determine with a relatively lower confidence level that the link L1 is a follow up content item to link L2 or link L3 because a subsequently posted content item can relate to a story that is chronologically earlier than a story relating to an earlier posted content item.

The comment module 304 can apply filtering techniques to appropriately minimize or eliminate consideration of postings that may provide noise in the identification of follow up content items. For example, the comment module 304 can detect spamming or malware activities based on coefficients between the user who made the first posting and the users who made subsequent postings. Coefficients reflect a quantitative measure of relatedness (affinity) between two members of the social networking system as reflected in the social graph. When the coefficient between a user who posted the first posting and a user who posted a responsive comment is relatively small, the comment module 304 can determine with a relatively lower confidence level that the link L2 or the link L3 is a follow content item in relation to the link L1. When the coefficient between a user who posted the first posting and a user who posted a responsive comment is relatively large, the comment module 304 can determine with a relatively higher confidence level that the link L2 or the link L3 is a follow up content item in relation to the link L1. The weights of the link L2 and the link L3 can be determined accordingly based on coefficients.

As another example, the comment module 304 can detect cycles of comments as noise. Such cycles can occur, for example, when members in a set of users repeatedly comment on the postings of other members in the set of users. When such repeated commenting occurs, the distinction between an original content item and follow up content items can be difficult to determine. As a result, in some instances, the postings associated with such repeated commenting can be discounted or eliminated in the determination of follow up content items. When a user who posted the first posting and a user who posted a responsive comment are members of a set of users that repeatedly comment on the postings of other members, the comment module 304 can determine with a relatively lower confidence level that the link L2 or the link L3 is a follow up content item in relation to the link L1. When the a user who posted the first posting and a user who posted a responsive comment are not members of a set of users that repeatedly comment on the postings of other members, the comment module 304 can determine with a relatively higher confidence level that the link L2 or the link L3 is a follow content item in relation to the link L1. The weights of the link L2 and the link L3 can be determined accordingly.

The token module 306 can identify follow up content items based on similarity of tokens associated with content items. Each content item can contain a title, description, summary, body, and any other segments of the content item. The segments of the content item can contain text. The token module 306 can tokenize some or all of the text in segments of content items. For example, tokens from the title or description of the content items can be selected. The token module 306 can perform a suitable tf-idf (term frequency-inverse document frequency) technique based on the selected tokens for the content items. The results of the tf-idf technique can be used to perform a comparison between two content items to determine if they both relate to the same story. In some embodiments, the comparison can involve the calculation of cosine similarity between a first content item associated with a first time and a second content item associated with a second time after the first time. When the cosine similarity between a first content item and a second content item is relatively high, the second content item can be determined to be a follow up content item in relation to the first content item with a relatively high level of confidence. When the cosine similarity between the first content item and the second content item is relatively low, the second content item can be determined to be a follow up content item in relation to the first content item with a relatively low level of confidence.

The token module 306 can select the scope of the corpus of the documents on which the calculation of the inverse document frequency of the tf-idf technique is based. In some embodiments, the token module 306 can use all of the content items relating to stories maintained by the social networking system (i.e., a global corpus) as documents to calculate the inverse document frequency. Any suitable duration of time can be used to define the corpus of documents maintained by the social networking system. As just one example, the corpus of the documents can be all content items that have been maintained by the social networking system in the last 30 days. A relatively shorter duration of time can optimize the use of memory by the social networking system while a relatively longer duration of time can potentially provide more accurate comparisons of content items.

The tag module 308 can identify follow up content items based on the identification of available tags associated with the story of the content item. Available tags can be specified by the social networking system, the third party systems 104, or both. Available tags can be organized according to an expansive hierarchical index (e.g., tree) having various categories with various hierarchical levels. The available tags of the hierarchical index can configured so that the available tags are sufficient to label with suitable specificity a story (or development thereof) relating to any content item managed by the social networking system or the third party systems 104. The available tags can be used by the social networking system or the third party systems 104 as labels for some or all maintained content items.

A tag of a certain category at a certain hierarchical level in the hierarchical index may be selected to label an original content item relating to story. In some embodiments, the category can include the story of the content item and the certain hierarchical level can be the lowest hierarchical level that is descriptive of the story. The selection of the tag associated with the original content item may be performed by the social networking system or one of the third party systems 104 that published the original content item.

In some embodiments, a tag for a content item can be selected at relatively higher hierarchical level to increase the number of users who are provided the content item. The social networking system can store user profiles reflecting the interests of users of the websites of the social networking system and the third party systems 104. Based on the tags of content items, the social networking system can provide content items to users in accordance with their interests as reflected in their user profiles. When the tags selected for content items are relatively more general, the content items accordingly can be provided to a relatively larger number of users. For example, one or more third party systems 104 can select tags at relatively higher hierarchical levels to increase the audience for their content. In some embodiments, the tag can be weighted by the social networking system to reflect the confidence level with which the tag functions as an accurate label for the story associated with the content item.

The tags for content items can be specified and selected in a variety of techniques. For example, the social networking system may provide a text box with a type ahead feature to allow the input of tags for content items that are published by the third party systems 104. The type ahead feature can suggest the use of certain normalized (standardized) or desired tags to label content items. Use of normalized tags can facilitate and streamline the labeling of content items based on their stories across many third party systems 104 and the social networking system. As another example, a contemporaneous display of the number, type, or other attribute of users whose interests match the tag being entered for a content item can be presented as a tag is being inputted. Such display can inform the selection of the tag so that the provision of the corresponding content item can be optimized for the intended audience.

To identify follow up content items in relation to the original content item, the tag module 308 can search for other content items based on the tag. In particular, the tag module 308 can identify other content items associated with the same tag. The content items associated with the same tag may be considered follow up content items in relation to the original content item.

In some embodiments, the tag module 308 can identify as follow up content items other content items associated with tags that are not the same as the tag of the original content item. For example, the content items associated with tags that are within the same category as and within a threshold number of higher or lower hierarchical levels of the category and the hierarchical level of the tag of the original content item can be considered follow up content items. This example can provide a larger number of follow up content items. As another example, when follow up content items of a more narrow story focus are desired, the content items associated with tags in the same category as and within a threshold number of lower hierarchical levels of the category and hierarchical level of the tag of the original content item can be considered follow up content items. As yet another example, when follow up content items of a more general story focus are desired, the content items associated with tags in the same category as and within a threshold number of higher hierarchical levels of the category and hierarchical level of the tag of the original content item can be considered follow up content items.

The timing module 310 can account for the timing associated with content items to identify follow up content items in relation to an original content item. In many instances, as between two content items that have been identified as both relating to a story, the content item associated with an earlier time can be deemed the original content item and the content item associated with the later time can be deemed the follow up content item. In this regard, the time associated with a content item can be the time that the content item was first published on the website of the social networking system or the website of one of the third party systems 104. When the content item was first published on the website of one of the third party systems 104, the time of first publication can be among the data obtained by the third party interface module 112 from the third party systems 104. When the content item was first published on the website of one of the third party systems 104 and the time of that first publication is not available, the time of first publication can be assumed to be the time the content item was first made available on the website of the social networking system.

The weighting module 312 can provide weight values to the identification of follow up content items in relation to an original content item. Quantitative weightings may be used to reflect a confidence level regarding a determination that a content item is or qualifies as a follow up content item in relation to an original content item. For example, a follow up content item can be assigned a weight value of one (or a value close to one) when the confidence level is high that the content item is a follow up content item. As another example, a follow up content item can be assigned a weight value of zero (or a value close to zero) when the confidence level is low that the content items is a follow up content item. As another example, a follow up content item can be assigned a corresponding weight value between the values of one and zero to reflect a particular level of confidence that the content item is a follow up content item. Each content item can be assigned a score based on the weight value or level of confidence that the content item qualifies as a follow up content item in relation to an original content item.

In relation to FIG. 2, the optimization module 206 can modulate the value of the constraints for identifying follow up content items in relation to an original content item. A loosening of the constraints for identifying follow up content items can result in the identification of relatively more follow up content items. In contrast, a tightening of the constraints for identifying follow up content items can result in the identification of relatively fewer follow up content items. Based on the desired amount of follow up content items as selected by an administrator of the social networking system, the optimization module 206 can provide a loosening or tightening of the constraints.

The constraints can include any factors or parameters that can govern the identification of follow up content items in relation to an original content item. Such constraints can include, for example, time (e.g., publication time) and weight values associated with content items. If a loosening of constraints is desired to identify relatively more or a larger variety of follow up content items, a threshold time difference between the time of the original content item and the time of a later content item to qualify the later content item as a follow up content item can be relatively higher. In addition, a threshold weight value for a content item to qualify as a follow up content item can be relatively lower. If a tightening of constraints is desired to identify relatively fewer or more relevant content items, a threshold time difference between the time of the original content item and the time of a later content item to qualify the later content item as a follow up content item can be relatively lower. In addition, a threshold weight value for a content item to qualify as a follow up content item can be relatively higher.

Other techniques to optimize the number, relevance, and variety of follow up content items can be used.

The optimization module 206 can train a machine learning model to improve the identification of follow up content items in relation to an original content item. In some embodiments, the optimization module 206 can perform supervised training of a machine learning model based on data obtained by the social networking system. For example, the social networking system or the third party systems 104 can monitor the identification of follow up content items, the presentation of the follow up content items to users of the social networking system, and the conversions performed on the follow up content items. Conversions performed on follow up content items can signal the successful identification of follow up content items. The conversions performed on the follow up content items can be provided to train the machine learning model. As another example, the social networking system or the third party systems 104 can use manual human oversight of the efficacy of process for identifying follow up content items by the content generation module 202. For instance, if the content generation module 202 produces suboptimal identifications of follow up content items, the suboptimal identifications can be provided to train the machine learning module. In another instance, if the content generation module 202 produces optimal identifications of follow up content items, the optimal identifications also can be provided to the train the machine learning model.

The presentation module 208 can manage the potential presentation of follow up content items to a user. The potential presentation of follow up content items can be performed in a variety of manners. For example, the follow up content items selected for presentation can be displayed in any preexisting or dedicated region of one or more pages of the websites of the social networking system or the third party systems 104. As another example, the follow up content items having the highest scores can be selected and the selected follow up content items can be provided to a technique that determines what content to present in a newsfeed of the user. If one or more related follow up content items are selected for presentation in a newsfeed, the follow up content items can be grouped for presentation. In one instance, the follow up content items can be displayed in a manner that allows for horizontal scrolling though references related to each of the follow up content items. As yet still another example, with respect to the potential presentation of follow up content items identified by the tag module 308, original content items and follow up content items can be presented alongside their associated tags. The tags can appear in a horizontally scrolling fashion. The tags can be organized by a particular publisher of the third party systems 104. A click on a tag can result in the further presentation of additional content items associated with the same tag. As yet still another example, the presentation module 208 also can provide attribution for presentation to the user, explaining why the follow up content item is being presented to the user. The attribution can accompany the presentation of the follow up content item.

Figure 4:
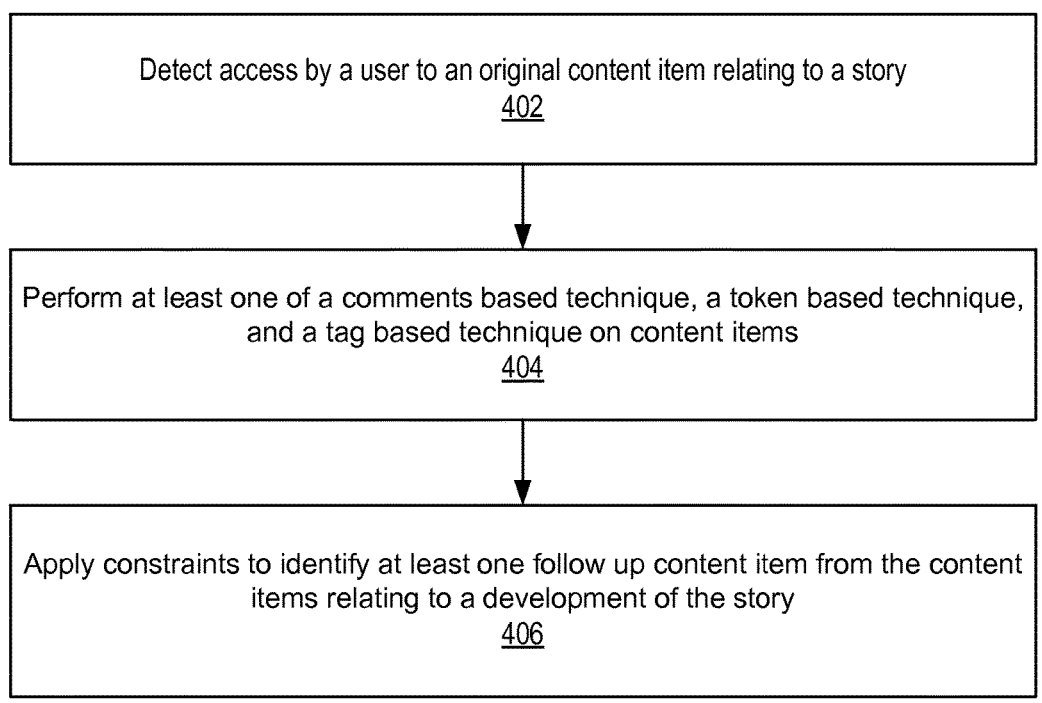
FIG. 4 illustrates a first example method, according to an embodiment of the present disclosure.

FIG. 4 illustrates an example method 400, according to an embodiment of the present disclosure. It should be appreciated that there can be additional, fewer, or alternative steps performed in similar or alternative orders, or in parallel, within the scope of the various embodiments unless otherwise stated.

At block 402, the method 400 can detect access by a user to an original content item relating to a story. At block 404, the method 400 can perform at least one of a comments based technique, a token based technique, and a tag based technique on content items. At block 406, the method 400 can apply constraints to identify at least one follow up content item from the content items relating to a development of the story. Other suitable techniques are possible.

Figure 5:
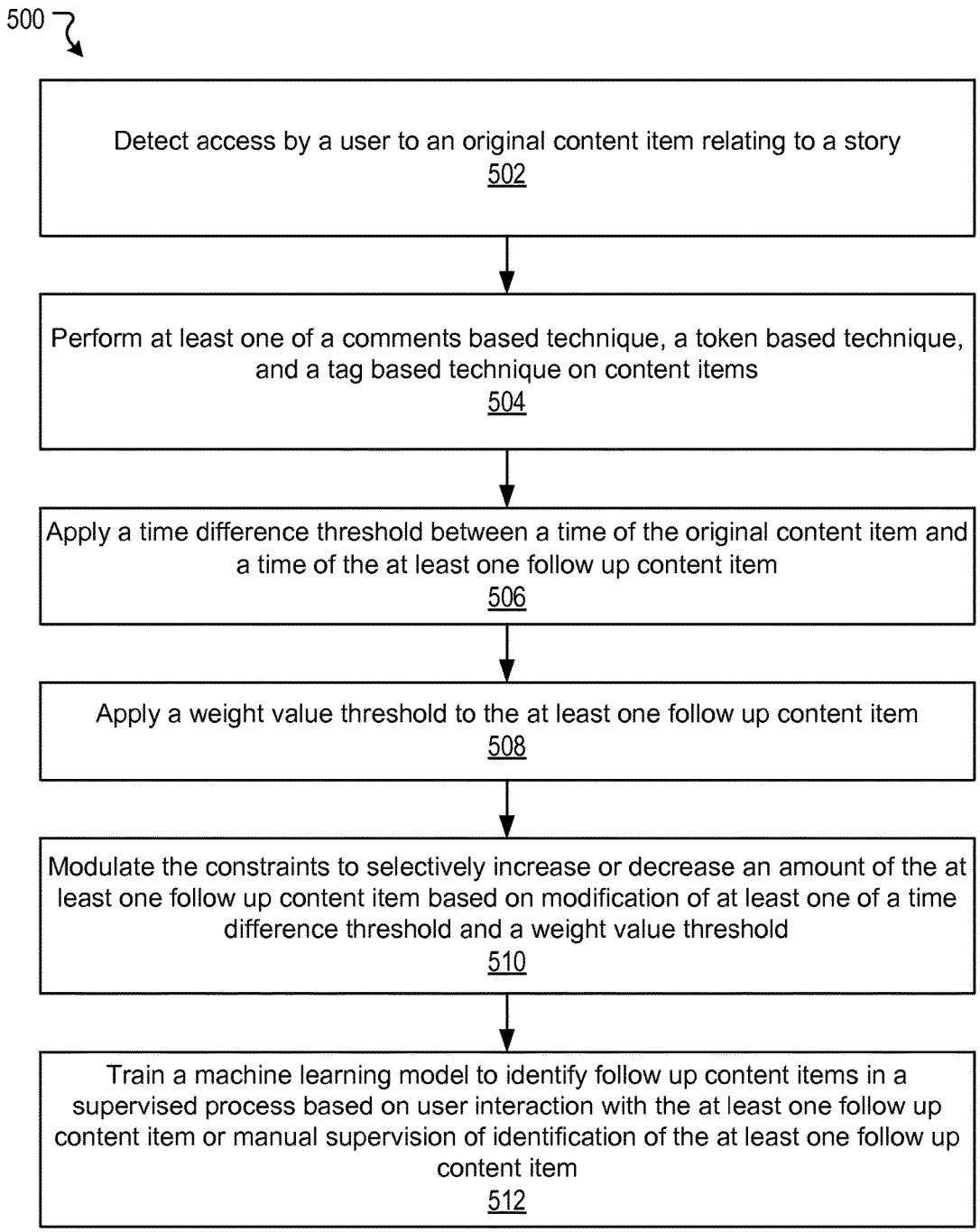
FIG. 5 illustrates a second example method, according to an embodiment of the present disclosure.

FIG. 5 illustrates an example method 500, according to an embodiment of the present disclosure. It should be appreciated that there can be additional, fewer, or alternative steps performed in similar or alternative orders, or in parallel, within the scope of the various embodiments unless otherwise stated.

At block 502, the method 500 can detect access by a user to an original content item relating to a story. At block 504, the method 500 can perform at least one of a comments based technique, a token based technique, and a tag based technique on content items. At block 506, the method 500 can apply a time difference threshold between a time of the original content item and a time of the at least one follow up content item. At block 508, the method 500 can apply a weight value threshold to the at least one follow up content item. At block 510, the method 500 can modulate the constraints to selectively increase or decrease an amount of the at least one follow up content item based on modification of at least one of a time difference threshold and a weight value threshold. At block 512, the method 500 can train a machine learning model to identify follow up content items in a supervised process based on user interaction with the at least one follow up content item or manual supervision of identification of the at least one follow up content item. Other suitable techniques are possible.

Social Networking System—Example Implementation

Figure 6:
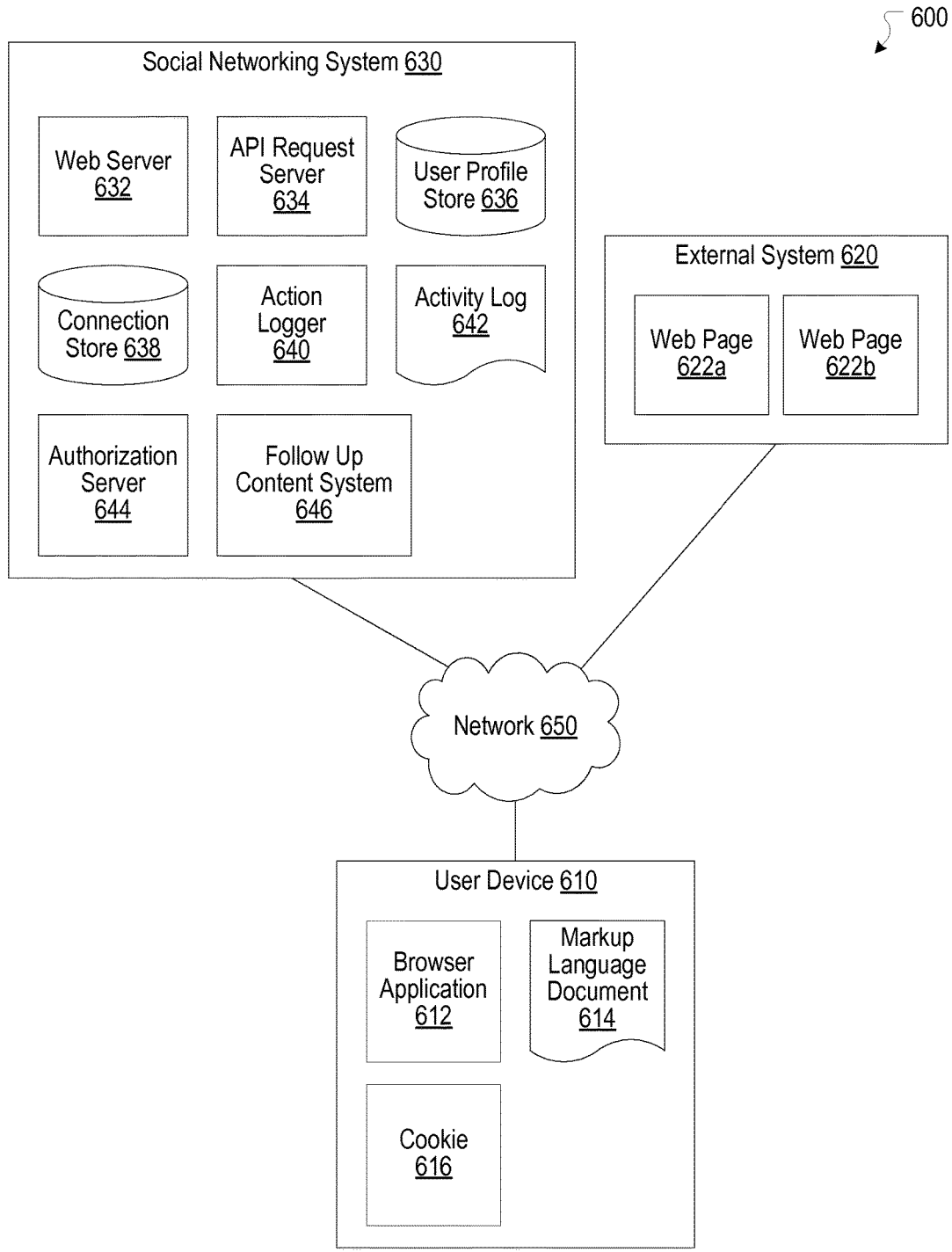
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a follow up content system 646. The follow up content system 646 can be implemented with the follow up content system 102.

Hardware Implementation

Figure 7:
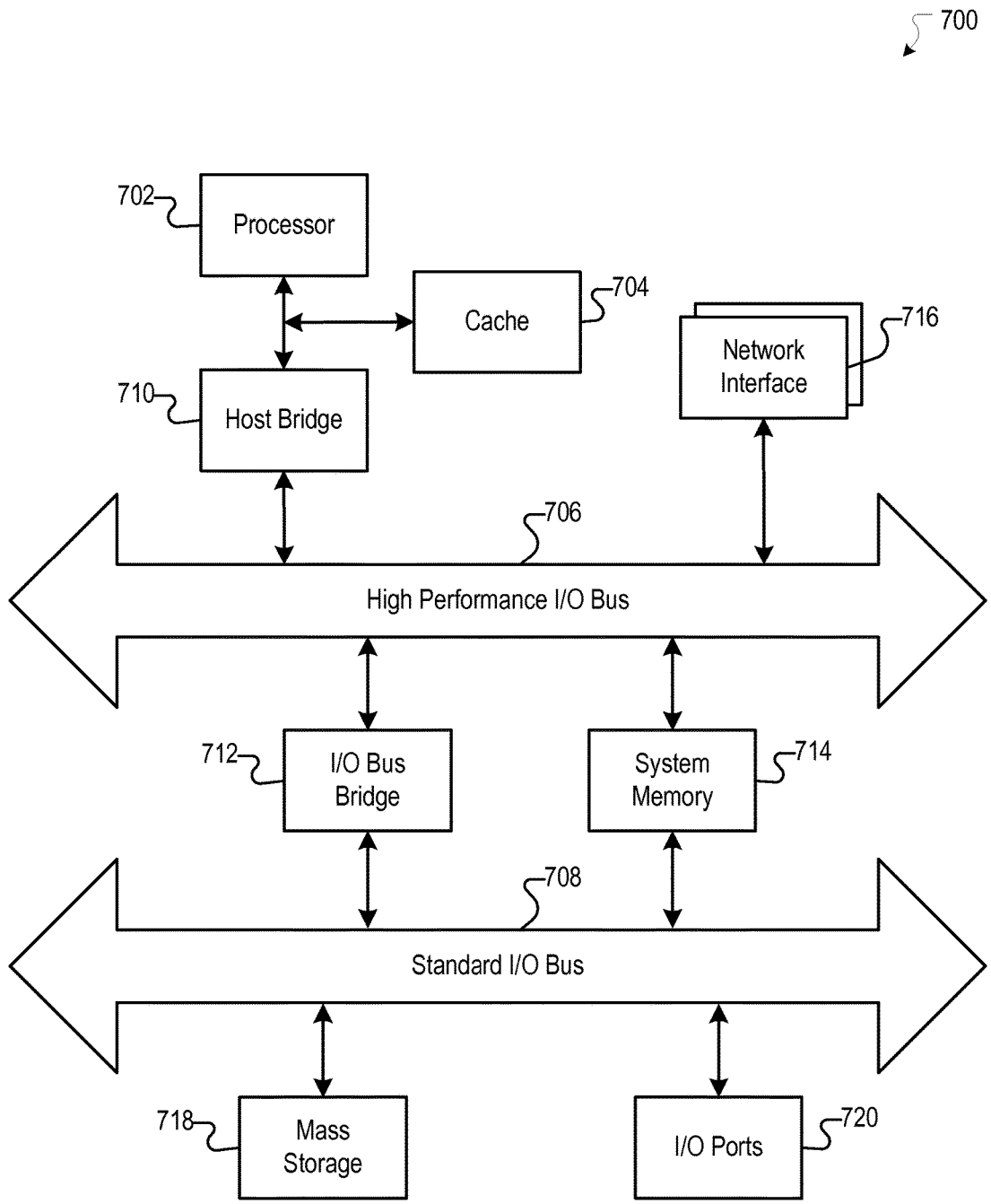
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   detecting, by a computing system, access by a user to an original content item relating to a story, wherein the original content item is published through a social networking system or a website of a third party system and the access by the user includes, in relation to the original content item, at least one of an indication of approval or a share by the user on the social networking system;
   in response to the detecting access by the user, performing, by the computing system, a tag based technique on content items to determine follow up content items, the tag based technique based on one or more normalized tags associated with a content item;
   applying, by the computing system, constraints to identify at least one follow up content item from the content items relating to a development of the story, wherein the applying constraints to identify the at least one follow up content item comprises applying a time difference threshold between a time of the original content item and a time of the at least one follow up content item; and
   training a machine learning model to identify follow up content items to a second original content item in a supervised process based on user interaction with the at least one follow up content item or manual supervision of identification of the at least one follow up content item, wherein the second original content item relates to a second story and the follow up content items to the second original content item relate to subsequent developments of the second story.

2. The computer-implemented method of claim 1, wherein the applying constraints to identify at least one follow up content item further comprises:
   applying a weight value threshold to the at least one follow up content item.

3. The computer-implemented method of claim 1, wherein the method further comprises performing a comments based technique on content items comprising:
   identifying a first posting having a first link and associated with a first time;
   identifying a second posting, in response to the first posting, having a second link and associated with a second time; and
   determining that the second link relates to the at least one follow up content item and that the first link relates to the original content item when the second time is subsequent to the first time.

4. The computer-implemented method of claim 1, wherein the method further comprises performing a token based technique on content items comprising:
tokenizing at least a portion of the original content item and at least a portion of the content items;
generating representations of the original content item and the content items based on the tokenizing;
comparing similarity between the original content item and the content items based on the representations; and
determining that a content item of the content items is the at least one follow up content item based on the similarity between the original content item and the content item.

5. The computer-implemented method of claim 4, wherein the generating representations further comprises:
performing a tf-idf technique.

6. The computer-implemented method of claim 4, wherein the comparing similarity between the original content item and the content items further comprises:
performing cosine similarity.

7. The computer-implemented method of claim 1, wherein the performing a tag based technique on content items further comprises:
receiving a tag associated with the story relating to the original content item, the tag based on a category and a hierarchical level of a hierarchical index; and
determining that a content item of the content items is the at least one follow up content item when the content item is labeled with the tag.

8. The computer-implemented method of claim 1, further comprising:
modulating the constraints to selectively increase or decrease an amount of the at least one follow up content item based on modification of at least one of a time difference threshold and a weight value threshold.

9. The computer-implemented method of claim 1, wherein a third party system distinct from a social networking system first publishes at least one of the original content item and the at least one follow up content item.

10. A system comprising:
at least one processor; and
a memory storing instructions that, when executed by the at least one processor, cause the system to perform:
detecting access by a user to an original content item relating to a story, wherein the original content item is published through a social networking system or a website of a third party system and the access by the user includes, in relation to the original content item, at least one of an indication of approval or a share by the user on the social networking system;
in response to the detecting access by the user, performing a tag based technique on content items to determine follow up content items, the tag based technique based on one or more normalized tags associated with a content item;
applying constraints to identify at least one follow up content item from the content items relating to a development of the story, wherein the applying constraints to identify the at least one follow up content item comprises applying a time difference threshold between a time of the original content item and a time of the at least one follow up content item; and
training a machine learning model to identify follow up content items to a second original content item in a supervised process based on user interaction with the at least one follow up content item or manual supervision of identification of the at least one follow up content item, wherein the second original content item relates to a second story and the follow up content items to the second original content item relate to subsequent developments of the second story.

11. The system of claim 10, wherein the wherein the applying constraints to identify at least one follow up content item further comprises:
applying a weight value threshold to the at least one follow up content item.

12. The system of claim 10, further comprising:
modulating the constraints to selectively increase or decrease an amount of the at least one follow up content item based on modification of at least one of a time difference threshold and a weight value threshold.

13. The system of claim 10, wherein a third party system distinct from a social networking system first publishes at least one of the original content item and the at least one follow up content item.

14. A non-transitory computer-readable storage medium including instructions that, when executed by at least one processor of a computing system, cause the computing system to perform the method comprising:
Detecting access by a user to an original content item relating to a story, wherein the original content item is published through a social networking system or a website of a third party system and the access by the user includes, in relation to the original content item, at least one of an indication of approval or a share by the user on the social networking system;
in response to the detecting access by the user, performing, by the computing system, a tag based technique on content items to determine follow up content items, the tag based technique based on one or more normalized tags associated with a content item;
applying, by the computing system, constraints to identify at least one follow up content item from the content items relating to a development of the story, wherein the applying constraints to identify the at least one follow up content item comprises applying a time difference threshold between a time of the original content item and a time of the at least one follow up content item; and
training a machine learning model to identify follow up content items to a second original content item in a supervised process based on user interaction with the at least one follow up content item or manual supervision of identification of the at least one follow up content item, wherein the second original content item relates to a second story and the follow up content items to the second original content item relate to subsequent developments of the second story.

15. The non-transitory computer-readable storage medium of claim 14, wherein the applying constraints to identify at least one follow up content item further comprises:
applying a weight value threshold to the at least one follow up content item.

16. The non-transitory computer-readable storage medium of claim 14, further comprising:
modulating the constraints to selectively increase or decrease an amount of the at least one follow up content item based on modification of at least one of a time difference threshold and a weight value threshold.

17. The non-transitory computer-readable storage medium of claim 14, wherein a third party system distinct from a social networking system first publishes at least one of the original content item and the at least one follow up content item.

* * * * *